United States Patent [19]

Ames

[11] Patent Number: 5,240,383
[45] Date of Patent: Aug. 31, 1993

[54] WHEELED FLOATABLE CONDUIT APPARATUS

[76] Inventor: John M. Ames, P.O. Box 1581, Williston, N. Dak. 58802

[21] Appl. No.: 5,841

[22] Filed: Jan. 19, 1993

[51] Int. Cl.$^5$ ............................................. F04B 21/00
[52] U.S. Cl. ..................................... 417/61; 138/103; 441/133
[58] Field of Search .............. 417/61; 415/7; 138/103; 210/242.1; 441/133

[56] References Cited

U.S. PATENT DOCUMENTS

| | | | |
|---|---|---|---|
| 1,973,325 | 9/1934 | Berger | 417/61 |
| 4,764,137 | 8/1988 | Schulte | 441/133 |
| 5,195,593 | 3/1993 | Brooks | 138/103 |

*Primary Examiner*—Richard E. Gluck
*Attorney, Agent, or Firm*—David A. Lingbeck

[57] ABSTRACT

This invention relates to a wheeled floatable conduit apparatus attachable to a pump device to suck water into the conduit apparatus and force water through the conduit apparatus. The conduit apparatus comprises an elongate tube through which water or other like fluids can be passed, a hydraulically-powered retractable wheeled means, a hitch means to mount to a vehicle to transport the conduit apparatus, and a self-leveling floatation assembly mounted at the rear end of the transport tube to maintain the transport tube and a pump device in a generally horizontal relationship for effective, generally strain-free operation of the pump device to pump water through the conduit apparatus. The wheeled means are lockable in either a retractable or transport position.

11 Claims, 7 Drawing Sheets

WHEELED FLOATABLE CONDUIT APPARATUS

BACKGROUND OF THE INVENTION

The present invention relates to a floatable wheeled conduit apparatus attachable to a pump device to float on a body of water, through which water is pumped primarily for irrigation use.

Floatable devices and floatable pumping devices are old in the art and have been constantly improved upon over the years. A review of the prior art does not suggest the present invention.

One known prior art is a FLOATABLE SUCTION HEAD, U.S. Pat. No. 3,794,446, used with a hydraulic pump and is adaptable to float on a body of water. The floatable suction head comprises a housing having a buoyant body with a ballast chamber therein and having an inlet and an outlet for passing water therethrough. The floatable suction head floats on a body of water in a horizontal level condition.

Another known prior art is a FLOATATION PUMP DEVICE, U.S. Pat. No. 3,617,146, comprising a hollow floatation tank which has a chamber mounted therein. The chamber has an inlet and an outlet which is connected to a conduit of a pump. The tank permits water to be pump from adjacent the water surface into the conduit without creating whirlpools and without allowing air to enter the suction line.

Another known prior art is a FLOATING PUMPING DEVICE, U.S. Pat. No. 4,089,620, comprising a buoyant float having an upright opening extending therethrough with a draft tube mounted beneath the float in alignment with the opening and comprising a motor-driven propeller rotatably mounted within the draft tube to pump water vertically through the draft tube and out through the opening of the float.

There is a definite need for a wheeled floatable conduit 7hich provides a user with more options and alternatives not offered by any of the prior art.

SUMMARY OF THE INVENTION

The present invention relates to a wheeled floatable conduit apparatus attachable to a pump device which pumps water through the conduit apparatus for irrigation use as such, comprising an elongate tube having a pair of coupler flanges one at each end of the tube; a pair of wheeled stub axles mounted to a pair of axle legs fixedly interconnected by a first spindle member mounted upon the tube; a hydraulic system detachably attached to an elongate deck extending along the length of the tube and the other fixedly attached to a lever arm connected to the first spindle member to retract the wheels generally much above a surface of water or the like or deploying the wheels to engage the ground; a pair of wing frames mounted at one end of the tube; eight floatation barrels mounted beneath the wing frames to float the conduit apparatus; and a hitch means attached to and exteding forward the front end of the tube to hitch the conduit apparatus to a vehicle to move the conduit apparatus in, out, and about a body of water or the like. The conduit apparatus is detachably mounted to a pump device at the back end of the tube. The pump device sucks water through the tube of the conduit apparatus for irrigation use and other uses.

It is an object of this invention to produce a wheeled floatable conduit apparatus capable of being conveniently moved in, out, or about a body of water as such.

Another object of this invention is to produce a wheeled floatable conduit apparatus having a wheeled means which can be effectively and conveniently retracted essentially above a body of water so that the pump device can effectively suck water even from shallow water depths.

Further, another object of this invention is to produce a wheeled floatable conduit apparatus which has a self-leveling floating assembly to automatically horizontally level the conduit apparatus in low or high water levels for effective pumping of the water.

Also, another object of this invention is to produce a wheeled floatable conduit apparatus which can be effectively coupled to other transporting means on land to transport water farther where desired by the user.

Yet, another object of this invention is to produce a wheeled floatable conduit apparatus which is durable and sturdy to transport water and which can be easily extended far into a body of water for a pump device to operate without strain and more effectively in more water.

Further objects and advantages of the present invention will become more apparent as the description proceeds and when taken in conjunction with the accompanying drawing wherein:

BRIEF DESCRIPTION OF THE DRAWING

FIG. 2 is a side perspective view of the wheeled floatable conduit apparatus with the wheels retracted essentially above a body of water to protect the wheels from corrosion and the like.

DETAILED DESCRIPTION OF THE INVENTION

Referring to the drawing in FIGS. 1 through 7, the wheeled floatable conduit apparatus 10 is illustrated as having an elongate transport tube 15, a pair of annular coupler collars 16 and 17 fixedly attached about the transport tube 15 one at either end of the tube, a deck frame 18 mounted upon the transport tube 15, a deck screen 19 mounted on the deck frame 18, a pair of retractable wheeled stub axles 25 and 26 fixedly mounted about the transport tube 15, a pair of wing frames 12 and 14 mounted near the back end 23 of the tube 15, and eight floatation barrels 80 snapped, clamped, or fastened to the underside of the wing frames 12 and 14. Each of the barrels 80 have a pair of longitudinally extending closely-spaced ribs projecting upwardly from the surface of the barrel and defining a crosspiece-receiving space between each pair of ribs to securely and engagingly receive the crosspieces 13 of the wing frames 12 and 14.

Figure 1:
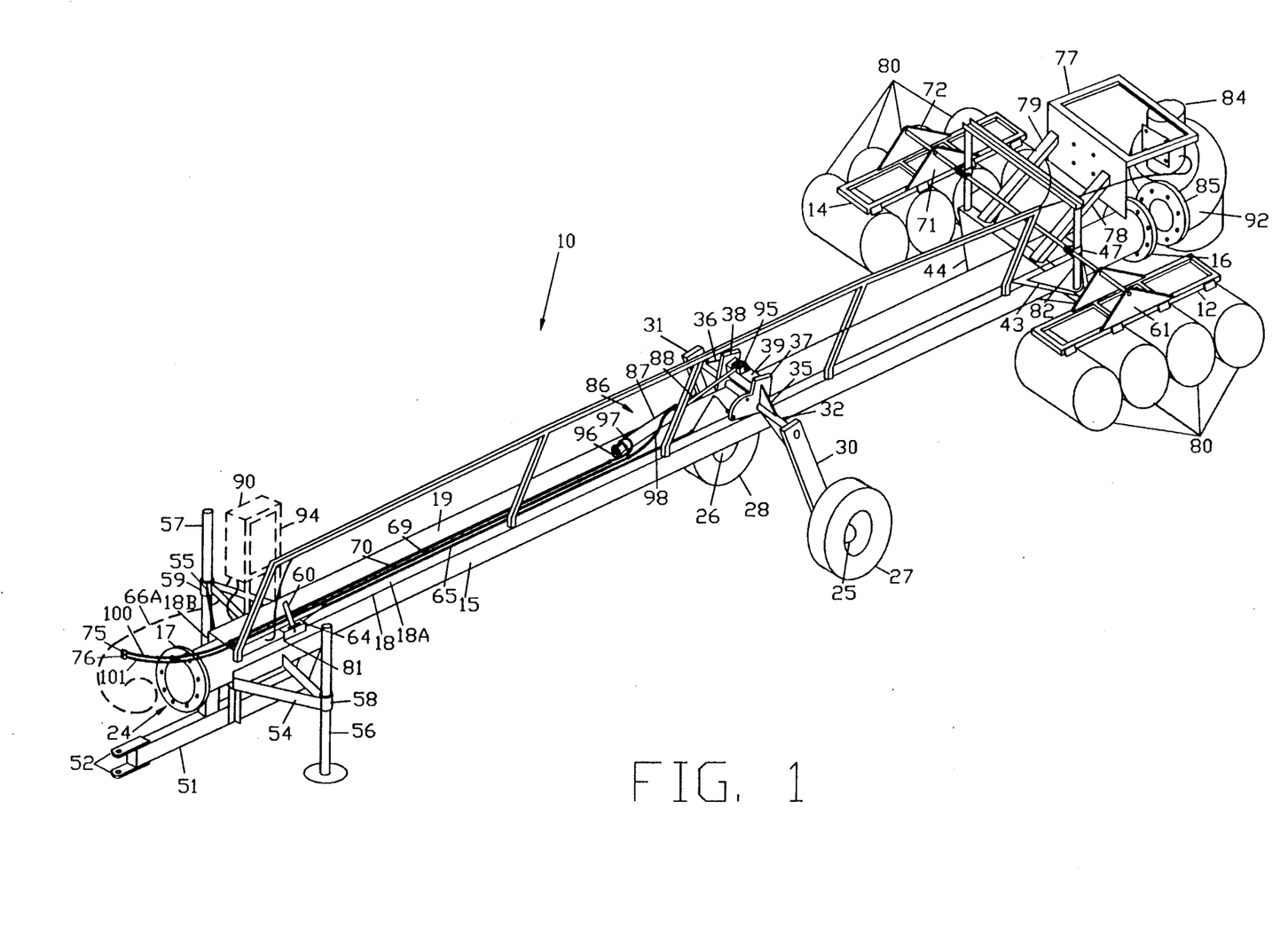
FIG. 1 is a side perspective view of the wheeled floatable conduit apparatus with the wheels deployed into a ground engagement position and with a pump device detachably coupled to the back end of the transport tube.
Figure 2:
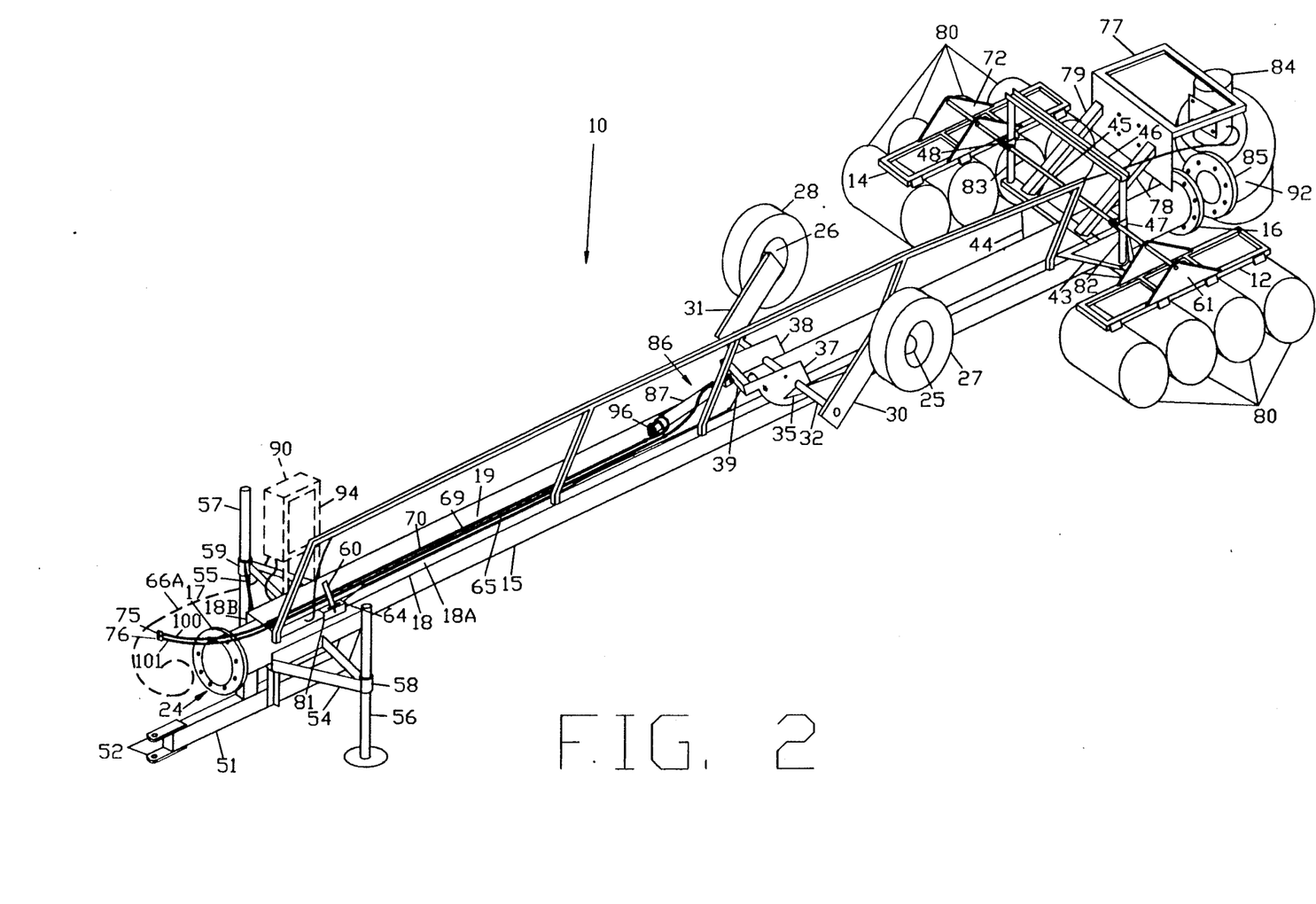

FIG. 1 and 2 illustrate the deck frame 18 having downwardly turned sides 18A and 18B and extending upon and along the length of and welded to the transport tube 15. FIGS. 1 and 2 further show a tubular rail 20 extending above the deck 19 and along the length of the transport tube 15 and interconnected to the deck frame 18 by eight elongate cross braces 21 which are intervally spaced along the length of the transport tube 15 and have opposite ends fixedly attached to one of the downwardly turned sides 18A of the deck frame 18 and fixedly attached to the bottom of the tubular rail 20 to support the rail 20 which has a bore extending therethrough for receiving and protecting an electric cord 66 connected to the pump device 84 to transmit power to the pump device 84.

Figure 4:
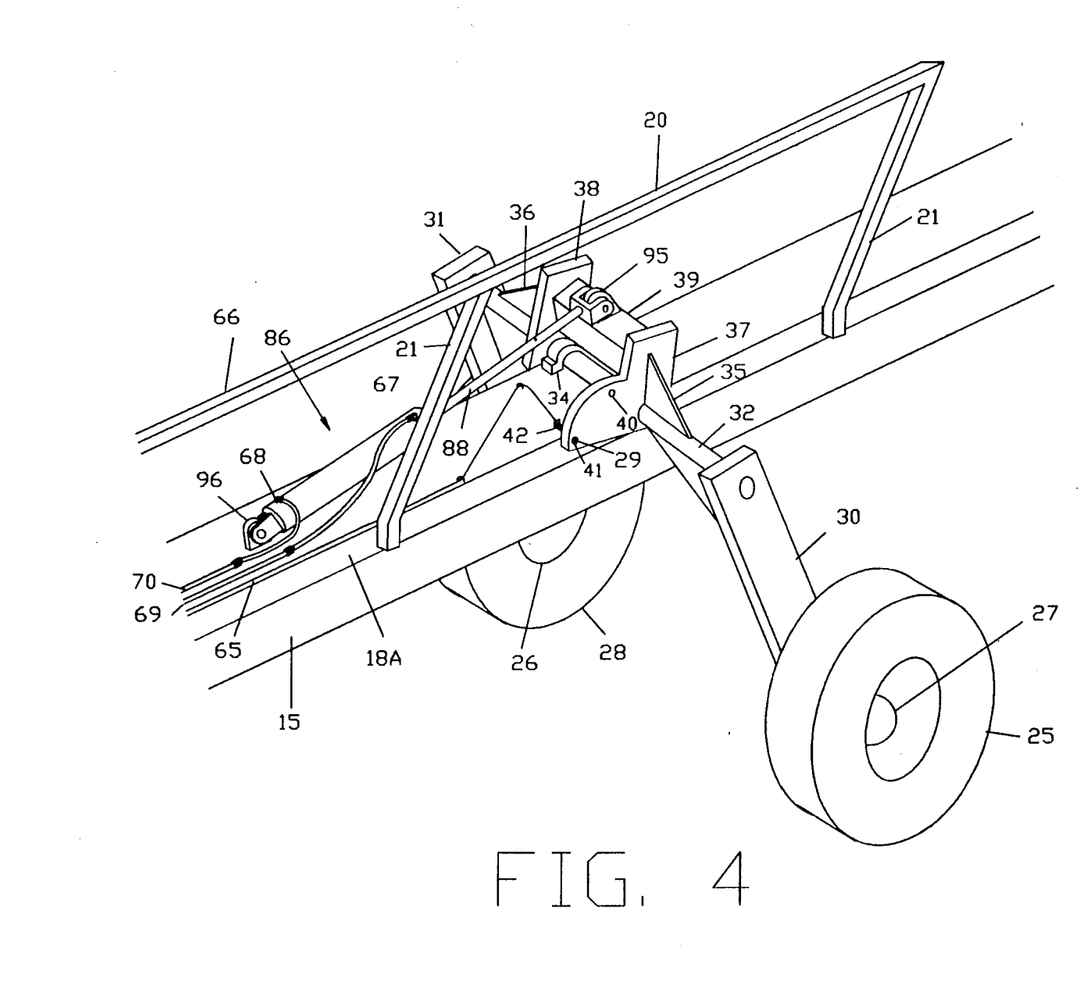
FIG. 4 is a section perspective view of the hydraulic system used to retract and deploy the wheels of the wheeled floatable conduit apparatus.

FIGS. 1, 2, and 4 illustrate the wheeled means comprising a pair of opposed stub axles 25 and 26 mounted to either side of the transport tube 15. The stub axles 25 and 26 are welded to the ends of the two axle legs 30 and 31 which are interconnected by a first spindle member 32 also preferably made of metal and preferably fixedly extending into the ends of the two axle legs 30 and 31 opposite the stub axles 25 and 26. As shown in FIGS. 1 and 2, the first spindle member 32 is fixedly mounted through two rectangular lever support members 37 and 38 near the bottoms thereof and rotatably mounted through two spindle-mounting brackets 33 and 34 affixed to and projecting upward from the sides of the deck 19. A lever arm 39 substantially parallel to the first spindle member 32, interconnects and rotates the two lever support members 37 and 38 which rotates the first spindle member 32. Two struts 35 and 36 are fixedly welded at their ends to the two lever support members 37 and 38 and to the axle legs 30 and 31 to strengthen and stabilize the axle legs 30 and 31 especially during the transportation of the conduit apparatus 10.

As shown in FIG. 4, two locking lug members 40 and 41 having eyelets therethrough are welded to the forward end of one of the lever support members 37. A support lug member 42 is welded upon the deck frame proximate to and forward the first spindle member 32. Cable 65 is fixedly attached to a springloaded pin 29 extending through the support lug member 42 and extends to near the front end 24 of the transport tube 15 and is fixedly attached to a movable handle 64 which is moved by a lever 60 pivotally mounted with a pin (not shown) to an angled bracket member 81. A top portion of the lever 60 extends upwardly through a slot in the angled bracket member 81 which has a recessed edge defining a portion of the perimeter of the slot, into which the lever 60 locks to disengage and withdraw the springloaded pin 29 from either of the eyelets of the locking lug members 40 and 41.

As shown in FIG. 4, the hydraulic mounting bracket members 95 and 96 both having holes therethrough are welded to the lever arm 39 and on the deck 19 forward the first spindle member 32. A double acting hydraulic cylinder 86 comprising a ram 88 and a cylinder 87 is detachably bolted at its ends to the pair of mounting bracket members 95 and 96. Two hydraulic hoses 97 and 98 having fittings at the ends thereof are disposed in the hydraulic cylinder 87 one near each end of the cylinder 87 and transport hydraulic fluid to the hydraulic cylinder 87. The ends of the hydraulic hoses 97 and 98 opposite the ends disposed in the cylinder 87 are coupled with fittings to a pair of elongated tubing lines 69 and 70 clamped to and extending along the deck 19 forward the hydraulic ram 86 to near the front end 24 of the transport tube 15. Another pair of hydraulic hoses 100 and 101 have ends coupled to the front ends of the pair of tubing lines 69 and 70 with another pair of fittings and have opposite ends fixedly crimped in two male fittings 75 and 76 attachable to two female fittings (not shown) connected to a hydraulic fluid source (not shown).

Figure 5:
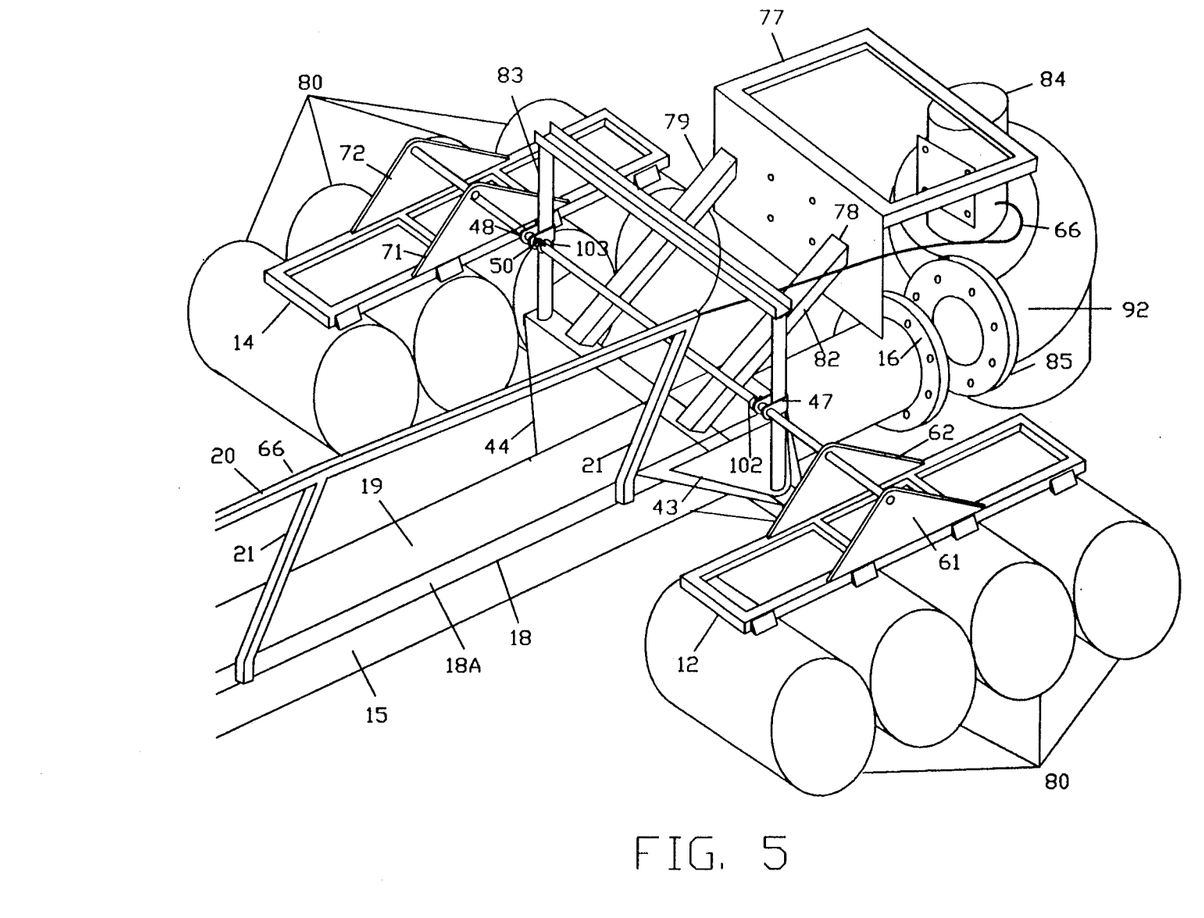
FIG. 5 is a section perspective detailed view of the floatation means mounted near the back end of the transport tube of the conduit apparatus.
Figure 6:
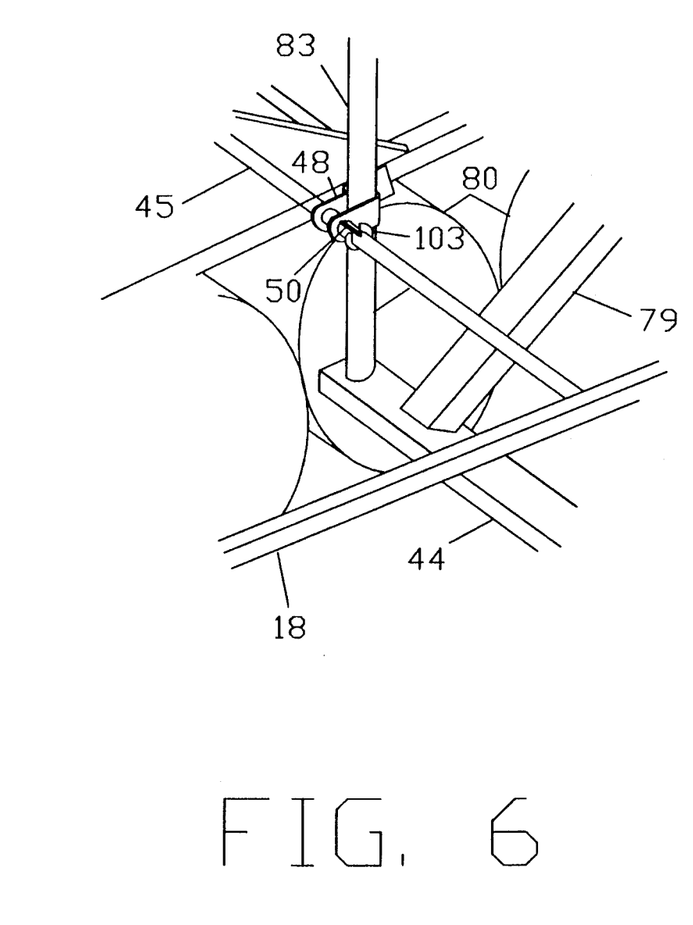
FIG. 6 is a section detailed view of the means used to automatic level the floatation means of the wheeled floatable conduit apparatus.

FIGS. 5 and 6 illustrate the floatation means comprising two wing frames 12 and 14 preferably constructed of metal, positioned to either side of the transport tube 15 near the back end 23 thereof and fixedly interconnected by a second spindle member 45 mounted upon the transport tube 15. Two frame extensions 61, 62, or 71, 72 are fixedly welded to and extend upward on the longitudinal edges of each wing frame and each have a hole through near the apex thereof, said holes of the frame extensions 61, 62, 71, and 72, on each wing frame being substantially in alignment to each other.

The second spindle member 45 fixedly extends through the holes of the frame extensions on both wing frames 12 and 14. A pair of spindle support brackets 43 and 44 are welded to either side of the deck frame 18 and have vertical bores passing through the support brackets 43 and 44 into which upright tubular supports 82 and 83 are disposed. A pair of U-shaped bracket 47 and 48 having spindle-receiving holes through the wings thereof are fixedly mounted about the tubular supports 82 and 83. The second spindle member 45 is rotatably mounted through the receiving holes in the wings of the U-shaped brackets 47 and 48. A pair of stop extensions 49 and 50 are disposed on the outside surfaces of the wings of the U-shaped brackets 47 and 48 and extend horizontally inward toward each other between the U-shaped brackets 47 and 48. A pair of flanges 102 and 103 each having a slot therein through which the stop extensions 49 and 50 extend, are fixedly mounted or welded about the second spindle member 45 adjacent to and between the U-shaped brackets 47 and 48 with the stop extensions 49 and 50 extending in the slots of the flanges 102 and 103 to restrict rotation of the second spindle member 45.

As shown in FIG. 6, an elongate brace 46 extends between and interconnects the two upright tubular supports 82 and 83 to support and strengthen the tubular supports 82 and 83. Extending upward on the top of the tubular supports 82 and 83 are threaded studs which extend through holes at the ends of the elongate brace 46. Wing nuts (not shown) are preferably used to fasten the elongate brace 46 upon the tubular supports 82 and 83.

FIG. 6 further illustrates eight fiberglass barrels 80 or buoyant members securely mounted to the underside of the wing frames 12 and 14. Four barrels are preferably arranged side by side along the length of each wing frame. The barrels 80 substantially float on or in a body of water or the like and support the back end 23 of the transport tube 15 and the pump device 84 which is preferably a centrifugal pump of the kind comprising an impeller rotatably mounted in the passage of a conduit tubular member 92 of the pump device 84 and comprising a motor mounted to the outside of the conduit tubular member 92 to drive the impeller which sucks water through the conduit member 92 and the transport tube 15 of the conduit apparatus 10. The second spindle member 45 rotates as the barrels 80 self adjust to the the water level. This self-adjustment assembly horizontally levels the pump device 84 and the transport tube 15 to effectively reduce any operating strain on the pump device 84 and to effectively transport water through the transport tube 15 with the least amount of resistance. The flanges 102 and 103 function as stops as to the rotation of the second spindle member 45. The stop extensions 49 and 50 pivot unhindered in the slots of the flanges 102 and 103 as the barrels 80 continuously adjust to the changing water levels, and substantially prevent the barrels 80 from flipping over upon themselves in the water.

Figure 3:
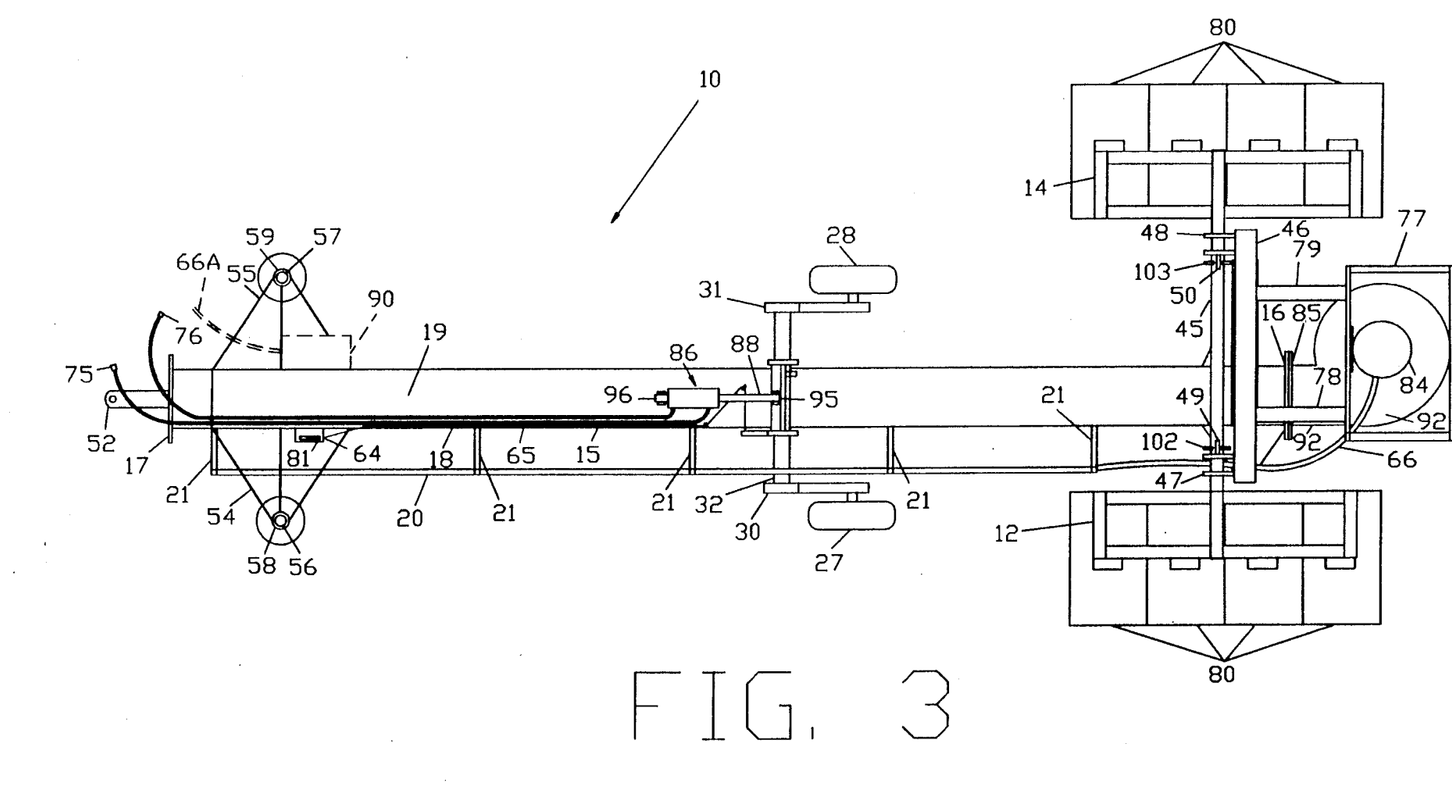
FIG. 3 is a top plan view of the wheeled floatable conduit apparatus.

FIGS. 3 and 5 also illustrate a shroud 77 having a hood and a side wall fixedly mounted upon the deck frame near the back end 23 of the transport tube 15 to protect the pump device 84 from the elements of the environment. Two elongated shroud support members 78 and 79 have ends welded to the side wall and have opposite ends welded to the deck frame 18. The hood extends rearward over the back end 23 of the transport tube 15 and over the pump device 84 detachably coupled to the transport tube 15. The conduit member 92 of the pump device 84 preferably has a conduit coupler collar 85 fixedly attached about the conduit member 92 of the pump device 84 near an end of the conduit member 92. The conduit coupler member 85 and the coupler collars 16 and 17 of the conduit apparatus 10 have a plurality of holes space about and through thereof. To attach the pump device 84 to the back end of the conduit apparatus 10, the user should align the conduit coupler collar 85 with the back end coupler collar 16 and should insert a plurality of bolts through the plurality of holes of both the back end coupler collar 16 and the conduit coupler collar 85 to securely fasten the two couplers 16 and 85 together to form a continuous passage through the conduit member 92 and the transport tube 15.

FIGS. 1 through 6 show a hitch means fixedly welded to the bottom of the transport tube 15 at the front end 24 thereof. A stand assembly frame 54 is fixedly welded to the hitch means and extend outwardly to either side of the transport tube 15. Two leg-receiving sleeves 58 and 59 are vertically and fixedly welded to the outer ends of the securing frame 54. Two handled leg stands 56 and 57 slidingly mount through the leg-receiving sleeves 58 and 59 to support, secure, and prop up the front portion of the conduit apparatus 10 above the ground to conveniently allow the user to hitch the conduit apparatus 10 to a vehicle to transport the conduit apparatus 10 and also to conveniently allow the user to detachably attach conduit extensions to the front end of the conduit apparatus 10. Two capscrews 61 and 62 are threaded through the sides of the sleeves 58 and 59 to engage the leg stands 56 and 57 which can be adjusted vertically to substantially adjust the vertical disposition of the front portion of the conduit apparatus 10 relative to the ground.

FIGS. 1 and 2 illustrate a tongue member 51 welded to and extending forward from the hitch means. The tongue member 51 has clevis projections 52 welded to and extending forward from the top end and bottom end of the tongue member 51. The clevis projections 52 have aligned pin-receiving holes therethrough. To hitch the conduit apparatus 10 to a hitch on a vehicle, the user should preferably position the projections 52 above and below the hitch on the vehicle with the pin-receiving holes being aligned with the hole through the hitch on the vehicle, and then should slide a pin through the holes in the projections 52 and the hitch. Once the conduit apparatus 10 is hitched to the vehicle, the user can conveniently move the conduit apparatus 10 in, out, and about a body of water and the like.

Figure 7:
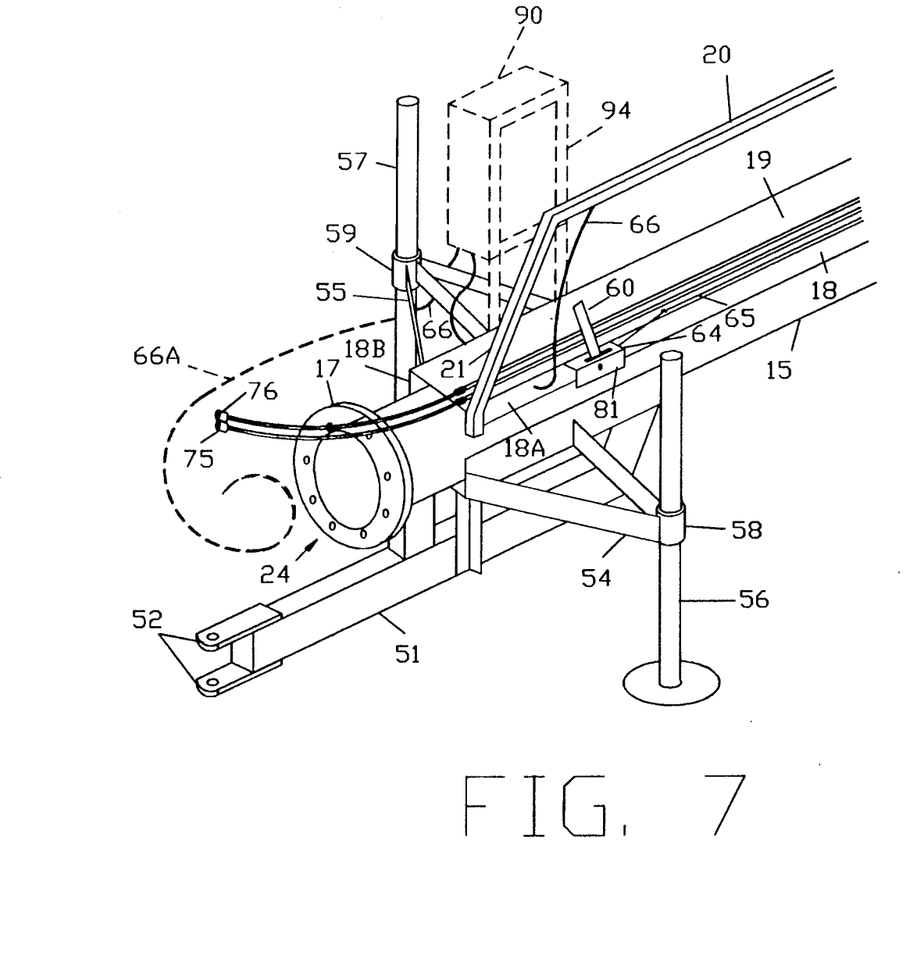
FIG. 7 is a perspective view of the wheeled floatable conduit apparatus showing, in particular, the optional electrical starter box securely mounted to the deck frame near the front end of the transport tube to power the pump device.

FIG. 7 illustrate an optional electrical starter box 90 securely mounted with clamps (not shown) to an upright frame member 94 fixedly welded to one side of the deck frame 18 near the front end 24 of the transport tube 15 essentially on the shore for a user to safely start and stop the pump device 84. The electrical cord 66 used to transmit electric current to the pump device 84 is also connected to the starter box 90 which houses the switches and circuits to energize the pump device 84. The electrical box 90 has a locking hinged cover 90A to close over the open side of the box 90 to protect the switches and circuits inside and to safeguard the user from any possible electrical shock. A second electric cord 66A is also connected to the starter box 90 and is connected to an energy source which provides the energy to the pump device 84 through the electrical box 90.

To position the conduit apparatus 10 in a body of water for effective pumping of water therefrom, the user backs the conduit apparatus 10 into a body of water from an accessible shore either by hand or by a vehicle hitched to the conduit apparatus 10. As long as the front end 24 of the transport tube is on or near the shore, the user can position the back end 23 of the transport tube 15 far into the body of water. To secure the conduit apparatus 10 on the shore, the user should engage the stand legs 56 and 57 on the ground to prop up the conduit apparatus 10 and should use a wire rope 91 having one end securely fastened to the deck frame near the wheeled means and the other end anchored on the shore upstream from the conduit apparatus 10, and the user should preferably use an anchor cable 92 having one end also securely fastened to the deck frame 18 near the wheeled means and the other end anchored on the shore downstream from the conduit apparatus 10.

To allow the conduit apparatus 10 to float substantially unhindered and to self-adjust relative to the water levels and also to protect the wheels, wheel bearings, and wheel rims from corroding due to the water, the user should preferably retract much of the wheels substantially above the surface of the water. To retract the wheels the user can connect the hydraulic hoses to a hydraulic fluid source to actuate the hydraulic means to urge the hydraulic ram into the hydraulic cylinder retracting the wheeled means generally upwardly. Before the wheeled means can be retracted, the user must remove the springloaded pin 29 from the locking lug member 41 near the bottom of one of the rectangular lever support member. To do this, the user should preferably pivot the lever 60 forward and engage the recessed edge of the slot of the angled bracket member to lock the lever and to disengage the springloaded pin 29 from the locking lug member. As the lever 60 is pivoted forward, the cable connected to the springloaded pin is urged forward effecting the springloaded pin 29 to slide out of the pin-receiving hole of the locking lug member 41. As the axles are retracted, the user should align the support lug member with the locking lug member 40 near the top of the rectangular lever support member. Once the support lug members 42 and the top locking lug member 40 are aligned, the user should preferably release the lever from the locked position and pivot the lever rearward to loosen the cable and to allow the springloaded pin 29 to slide through the pin-receiving hole of the top locking lug member 40. effectively locking the wheeled means in a retracted position. The user can then disconnect the hydraulic fluid source from the hydraulic ram to release the hydraulic pressure in the cylinder.

The user, if desired, can effectively attach flexible water hoses or the like to the front end 24 of the transport tube to effectively carry water in land. The front end coupler collar 17 permits the user to detachably attach a hose or the like having a like coupler collar to the front end coupler collar 17.

To move the conduit apparatus 10, the user should preferably deploy the wheels into a transportation mode or position by first moving the lever 60 forward into the recessed slot to effect disengagement of the springloaded pin 29 from the top locking lug member on the rectangular lever support member. The user should then actuate the hydraulic means to urge the piston out of the cylinder which urges the wheeled means into a transportation mode or position. To lock the wheeled means into the transportation position, the user should align the bottom locking lug member with the support lug member and then should release the lever 60 to allow the springloaded pin 29 to slide through the pin-receiving hole of the bottom locking lug member.

It will be obvious that various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A wheeled floatable conduit apparatus for use with a pump comprising
    an elongate transport tube having a bore therethrough extending from a back end to a front end, and having two coupling collars affixed thereabout one at each end thereof;
    a deck mounted upon said elongate tube for a user to conveniently move about on said tube;
    a wheeled means retractably mounted about said transport tube to provide convenient transportation of said conduit apparatus;
    a floatation means adjustably mounted about said elongate tube near said rear end of said tube to float much of said conduit apparatus in or on a body of water or the like;
    a retractable means securely mounted upon said transport tube to retract said wheeled means much above water or the like to protect said wheeled means and to deploy said wheeled means into a generally transport mode;
    a locking means mounted upon said transport tube to lock said wheeled means in a retractable or a transport position;
    a hitch means fixedly mounted at said front end of said transport tube to hitch to a vehicle or the like to transport said conduit means; and
    a stand assembly mounted about said front end of said transport tube to substantially support much of said conduit apparatus on the ground.

2. A wheeled floatable conduit apparatus as described in claim 1, wherein said coupling collar at said back end of said transport tube is attachable to a collar affixed about a conduit member of said pump to support said pump in a body of water or the like.

3. A wheeled floatable conduit apparatus as described in claim 1, wherein said deck further comprises a frame and a platform upon which said user can move and a tubular rail mounted above and along said deck for a user to grasp and for an electric cord connected to said pump to pass through to safeguard against said user receiving an electrical shock.

4. A wheeled floatable conduit apparatus as described in claim 1, wherein said wheeled means comprises
    a pair of axles;
    a pair of axle arms fixedly attached near ends thereof to said axles; and
    a first spindle member transversely and rotatably mounted upon said conduit apparatus and interconnecting said axle arms and fixedly attached at ends of said axle arms opposite axles to retract and deploy said axles.

5. A wheeled floatable conduit apparatus as described in claim 4, wherein said wheeled means further comprise a lever arm means proximately connected to or fixedly mounted to said first spindle member to rotate said first spindle member to retract and deploy said axles.

6. A wheeled floatable conduit apparatus as described in claim 1, wherein said floatation means comprises
    a pair of wing frames interconnected by a second spindle member transversely and rotatably mounted upon said conduit apparatus near said rear end of said transport tube, said wing frames mounted to either side of said transport tube; and
    at least two buoyant members mounted to said wing frames to float much of said conduit apparatus and said pump detachably attached to said conduit apparatus in or on a body of water or the like.

7. A wheeled floatable conduit apparatus as described in claim 6, wherein said buoyant members are proximately connected to said second spindle member to continuously self-adjust in a body of water or the like according to the water level to generally maintain said pump detachably coupled to said conduit apparatus at a generally horizontal level.

8. A wheeled floatable conduit apparatus as described in claim 1, wherein said retractable means comprises a hydraulic ram detachably mounted to said wheeled means and connected to a hydraulic fluid source to retract and deploy said axles.

9. A wheeled floatable conduit apparatus as described in claim 1, wherein said locking means comprises
    a plurality of lug members two of which are locking lug members affixed to and extending from said wheeled means;
    a springloaded pin slidable in said lug members; and
    a lever means pivotally mounted on said conduit apparatus to disengage said springloaded pin from said locking lug members to lock said wheeled means either in a retracted or a transport position.

10. A wheeled floatable conduit apparatus as described in claim 1 wherein said stand assembly comprises
    a frame means affixed to said hitch means and mounted to either side of said transport tube; and
    at least one leg stand slidably engageable through said frame means and engageable to the ground to substantially secure and support much of said conduit apparatus.

11. A wheeled floatable conduit apparatus for use with a pump comprising
- an elongate transport tube having a bore therethrough extending from a back end to a front end, and having two coupling collars affixed thereabout one at each end thereof;
- a deck mounted upon said elongate tube for a user to conveniently move about on said tube;
- a wheeled means retractably mounted about said transport tube to provide convenient transportation of said conduit apparatus;
- a floatation means adjustably mounted about said elongate tube near said rear end of said tube to float much of said conduit apparatus in or on a body of water or the like;
- a retractable means securely mounted upon said transport tube to retract said wheeled means much above water or the like to protect said wheeled means and to deploy said wheeled means into a generally transport mode;
- a locking means mounted upon said transport tube to lock said wheeled means in a retractable or a transport position;
- a hitch means fixedly mounted at said front end of said transport tube to hitch to a vehicle or the like to transport said conduit means;
- a stand assembly mounted about said front end of said transport tube to substantially support much of said conduit apparatus to the ground; and
- an electric box securely mounted to said deck near said front end of said transport tube to selectively energize said pump.

* * * * *